US010875538B2

(12) United States Patent
Kodali et al.

(10) Patent No.: US 10,875,538 B2
(45) Date of Patent: Dec. 29, 2020

(54) EXHAUSTIVE DRIVING ANALYTICAL SYSTEMS AND MODELERS

(71) Applicant: Allstate Insurance Company, Northbrook, IL (US)

(72) Inventors: Anuradha Kodali, Fremont, CA (US); Sunil Chintakindi, Fremont, CA (US); Regina Madigan, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 175 days.

(21) Appl. No.: 16/133,959

(22) Filed: Sep. 18, 2018

(65) Prior Publication Data

US 2020/0086882 A1 Mar. 19, 2020

(51) Int. Cl.
*B60W 40/09* (2012.01)
*B60W 40/08* (2012.01)

(52) U.S. Cl.
CPC ..... *B60W 40/09* (2013.01); *B60W 2040/0827* (2013.01); *B60W 2040/0836* (2013.01); *B60W 2040/0845* (2013.01); *B60W 2540/22* (2013.01); *B60W 2540/26* (2013.01)

(58) Field of Classification Search
None
See application file for complete search history.

(56) References Cited

U.S. PATENT DOCUMENTS 7,389,178 B2 6/2008 Raz et al.
10,407,079 B1 * 9/2019 Chan ........................ G06K 9/44
10,618,523 B1 * 4/2020 Fields .................. B60W 40/09
2017/0021764 A1 1/2017 Adams et al.
2018/0196427 A1 * 7/2018 Majumdar .......... B60W 60/005
2018/0362049 A1 * 12/2018 Avireddi ............ B60W 30/182
2019/0064804 A1 * 2/2019 Frazzoli ................ B60K 28/08
2019/0382025 A1 * 12/2019 Mena Benito ....... A61B 5/0531

OTHER PUBLICATIONS

Dec. 4, 2019—(WO) International Search Report & Written Opinion—PCT/US19/51409.

* cited by examiner

*Primary Examiner* — Tamara L Weber
(74) *Attorney, Agent, or Firm* — Banner & Witcoff, Ltd.

(57) ABSTRACT

Exhaustive driving analytical methods, systems, are apparatuses are described. The methods, systems, are apparatuses relate to monitoring driver and/or driving behaviors in view of an exhaustive list of variables to determine safety factors, identify times to react to events, and contextual information regarding the events. The methods, systems, and apparatuses described herein may determine, based on a systematic model, reactions and reaction times, compare the vehicle behavior (or lack thereof) to the modeled reactions and reaction times, and determine safety factors and instructions based on the comparison.

20 Claims, 5 Drawing Sheets

EXHAUSTIVE DRIVING ANALYTICAL SYSTEMS AND MODELERS

TECHNICAL FIELD

Aspects of the present disclosure generally relate to exhaustive driving analytical systems and modelers.

BACKGROUND

Often, improper vehicle operation is a result of human error and/or environmental factors. Once an initial driving test is passed, drivers are not often re-tested in order to maintain and/or update safe driving behaviors. Drivers are sometimes disciplined for poor driving behaviors as a result of an infraction, but many infractions go unnoticed. The proposed systematic plurality of sensors and circuitry disclosed herein may monitor, analyze, and initiate alerts or warnings for such previously unnoticed infractions and/or initiate instructions for autonomous control of a vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to monitoring driver and/or driving behaviors in view of an exhaustive list of variables to determine safety factors, identify times to react to vehicle events, contextual information regarding the and/or actually occurring events, and how a driver perceives such contextual information. In some examples, the methods, systems, and apparatuses described herein may determine, based on a systematic model, reactions and reaction times, compare the vehicle behavior (or lack thereof) to the modeled reactions and reaction times, and determine safety factors and instructions based on the comparison. Such information is useful to drivers in real time, to autonomous driving vehicle computers prior to a vehicle event, and/or to service personnel after a vehicle event.

DETAILED DESCRIPTION

Vehicle activity is often based on a number of factors including roadway engineering, traffic dynamics, automotive engineering, human factors (e.g., inappropriate/inadequate driver actions/reactions), environmental conditions, etc. In some examples, it may be useful to utilize in-car surveillance for monitoring driver behaviors associated with vehicle activity, such as, distractibility or incapability. In some example, what a driver chooses to do may provide more information relative to safe driving than what a driver is capable of doing. As used herein, vehicle activity corresponds to a group or series of vehicle events that occur during operation of a vehicle. A trip from a first location to a second location may comprise a plurality of vehicle activities. For example, vehicle activity may be exiting a highway on an exit ramp. Example events for exiting a highway on an exit ramp may include decelerating below highway speed limit, initiating a turn signal, changing lanes, increasing or decreasing vehicle elevation, turning, etc. Each event may comprise factors such as actions and reaction. Actions may correspond to what a driver does or is doing during a vehicle event (e.g., whether driver is attentive), whereas reactions may correspond to what a vehicle does or is doing during a vehicle event (e.g., whether vehicle is performing as expected for such an event).

The presently described methods, systems, and apparatuses may involve an entire trip analysis that identifies one or more safety factors for driver actions, driving behavior, and environmental effects in a modular format. Such analysis may include an exhaustive list of factors, because each factor may contribute to a driver's choice in action and the corresponding vehicle reaction. Where the analysis is missing factors such as, for example, due to data unavailability, models generated as disclosed herein may utilize partial datasets to predict behavioral aspects associated with the missing factors.

Figure 1:
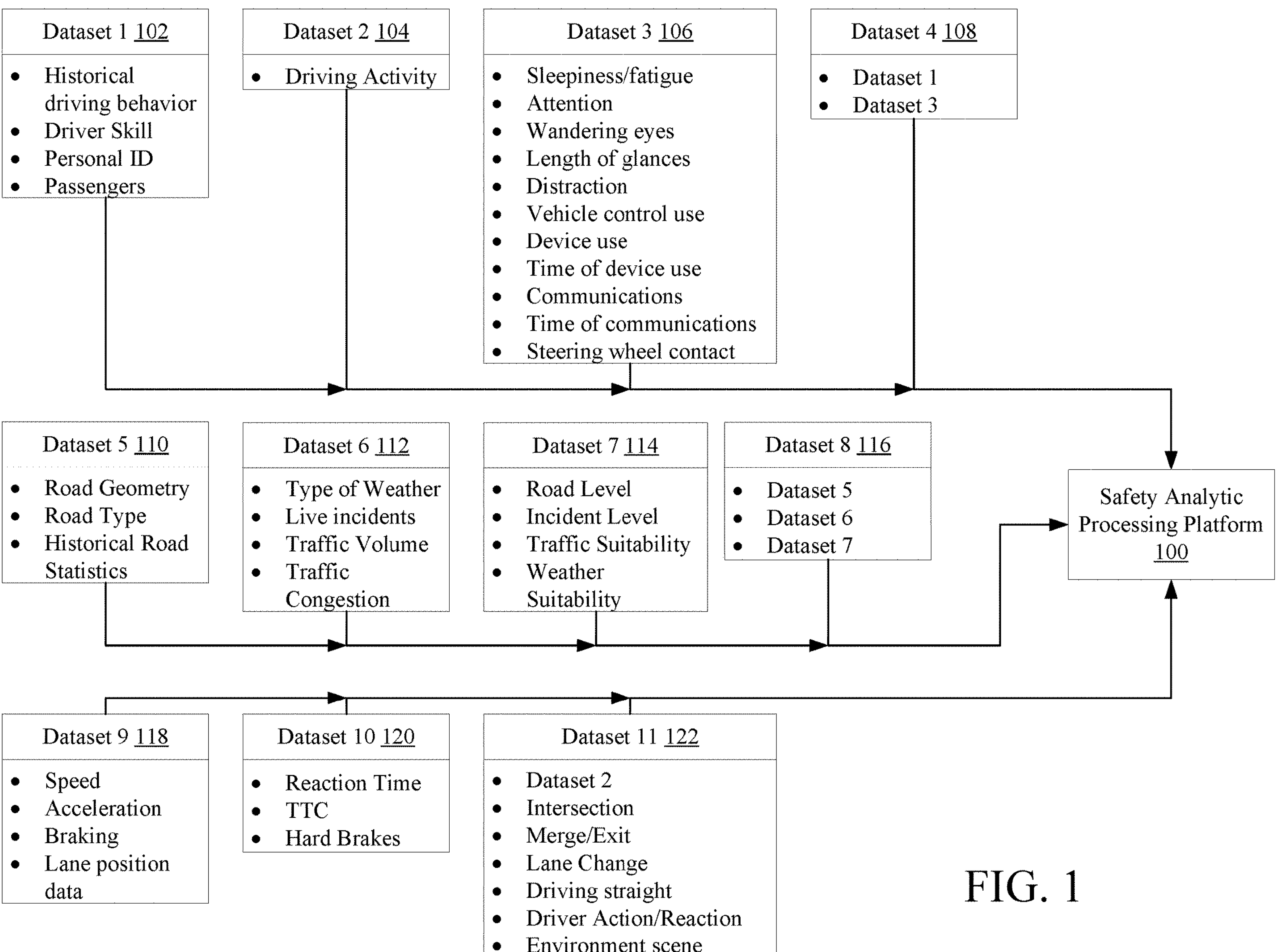
FIG. 1 illustrates an example safety analytic processing platform and a plurality of example datasets utilized in accordance with one or more aspects described herein.

With reference to FIG. 1, the present disclosure relates to a safety analytic processing platform (SAPP) 100 using a unique holistic analysis of driver and/or driving behavior to determine safety factors, time to react to events, situational information providing unprecedented context, and autonomous vehicle instructions for preventing and/or avoiding the events. The SAPP 100 may perform methods and may be or may be part of apparatuses and/or systems described herein. The SAPP 100 may utilize one or more of a plurality of datasets such as, for example, dataset 1 102, dataset 2 104, dataset 3 106, dataset 4 108, dataset 5 110, dataset 6 112, dataset 7 114, dataset 8 116, dataset 9 118, dataset 10 120, or dataset 11 122 to determine one or more of reaction times, eye gazes, number of gazes off roadway, duration of longest glance, number of eye blinks, percentage of time eyes are closed, hand gestures, mouth gestures, body movements, facial expressions hands on wheel, seatbelt non-use, hard braking, speeding, acceleration/deceleration, jerks, navigation through intersections or on ramps, etc. Such determinations may be useful for the SAPP 100 for determining safety factors, times to react, and situational context both before and after vehicle events.

Each dataset of the plurality of datasets may be utilized in one or more functions as weights and/or inputs. In some examples, dataset 1 102 and/or dataset 2 104 may correspond to weights associated with personal information and/or driving activity. Such information may be input by a driver, accessed through one or more databases including driver profiles, or automatically populated via network searches. In some examples, dataset 1 102 and/or dataset 2 104 may include personal information such as, for example, the driver's historical medication use, age, gender, marital status, education, occupation and/or driving data such as, for example, driving behavior, driving experience, crash history, traffic violations, experience with the route, duration of a trip, planned route.

In some examples, dataset 3 106 and/or dataset 4 108 may correspond to driver actions. Such information may be determined based on one or more sensors including, for example, vehicle cameras, microphones, touch sensors, motion sensors, light imaging, detection, and ranging (LIDAR), etc. One or more driver actions may include, for example, using a mobile device (e.g., talking, answering, dialing, listening, texting, searching, etc.), eating, drinking, spilling, smoking, reading, writing, grooming, reaching, leaning, looking for something inside/outside the vehicle, manipulating vehicle controls, manipulating music/audio controls, listening to audio, singing/dancing to audio, adjusting seatbelts, mirrors, lights, seatbelt, using driver assisted tools (e.g., navigation, global positioning system (GPS)), being distracted by passengers (e.g., babies, family, friends), being visually distracted by external factors (e.g., billboards, other vehicles, accidents, emergency services (e.g., firetrucks, ambulances, police cars, etc.) animals, pedestrians, etc.), looking for directions, signals, road signs, stores, gas station, or parking spaces, or one or more driver conditions such as sleepiness, fatigue, drunkenness while driving, health conditions (heart attack, blackout, loss of consciousness, seizure, blurred vision etc.), emotional distress (depression, angry, disturbed), or carelessness.

In some examples, dataset 5 110, dataset 6 112, dataset 7 114, and/or dataset 8 116 may correspond to environmental data. For example, the environmental data may include weather data (e.g., ambient temperature, ambient lightning conditions, time of day, daytime, nighttime, twilight, clear, dry, wet, fog, rain, ice, snow, clouds, or sun glare), infrastructure data (e.g., road geometry, road gradient, road curvature, number of lanes, lane width, shoulder width, straight road path, curved road path, intersection on a straight road path, intersection on a curved road path, merge lanes, asphalt road surface, concrete road surface, parking lot, loading area, alleyway, one-way road, rural/urban undivided road, rural/urban divided road via a median, rural/urban divided road, or gravel/sand road), traffic data (e.g., types of traffic signs, traffic congestion, traffic inflow/outflow, speed of lead/following/side vehicle, spacing between vehicles, response variable time headway between vehicles, type of leading vehicle, traffic flow, remaining travel time, location, field of view, or crosswalks), and/or vehicle characteristics (e.g., other vehicle headlight glare, vehicle mass, vehicle type, vehicle controls, vehicle features, or mechanical failures).

In some examples, dataset 9 118 and/or dataset 10 120 may correspond to vehicle reactions based on a vehicle event or anticipated vehicle event. One or more vehicle reactions may include variations in vehicle speed, steering position, lateral acceleration, longitudinal acceleration, deceleration rate, angular rate, autonomous overtaking, brake duration, braking behavior, brake pedal position, clutch usage, belt usage, lane position data, lane deviation, lane departures, vehicle position, standard of lateral position, range rate, yaw rate, headlights/signal usage, shock wave frequency, or jerks (composite g-force and speed). In some examples, such variations may be utilized to determine one or more of a reaction time, a time headway, a gap headway distance and time, rate of change of gap headway, time to collision, post encroachment time, encroachment time, deceleration to safety time, time-to-crosswalk, proportion of stopping distance time to lane crossing, right lane departure warning, time to right edge curving, hard brakes, or missing traffic signals.

One or more of the dataset 1 102, dataset 2 104, dataset 3 106, dataset 4 108, dataset 5 110, dataset 6 112, dataset 7 114, dataset 8 116, dataset 9 118, dataset 10 120, or dataset 11 122 may be functions of other datasets. For example, dataset 4 108 may be a function of one or more of dataset 1 102 or dataset 3 106. Dataset 8 116 may be a function of one or more of dataset 5 110, dataset 6 112, or dataset 7 114. The SAPP 100 may determine a safety factor as a function of one or more of the dataset 1 102, dataset 2 104, dataset 3 106, dataset 4 108, dataset 5 110, dataset 6 112, dataset 7 114, dataset 8 116, dataset 9 118, dataset 10 120, or dataset 11 122. The SAPP 100 may determine a time to react to a vehicle event as a function of vehicle event information, environment information, and vehicle reaction information. The SAPP 100 may determine situational context as a function of the safety factor, the time to react, vehicle event information, environment information, and vehicle reaction information.

Figure 2:
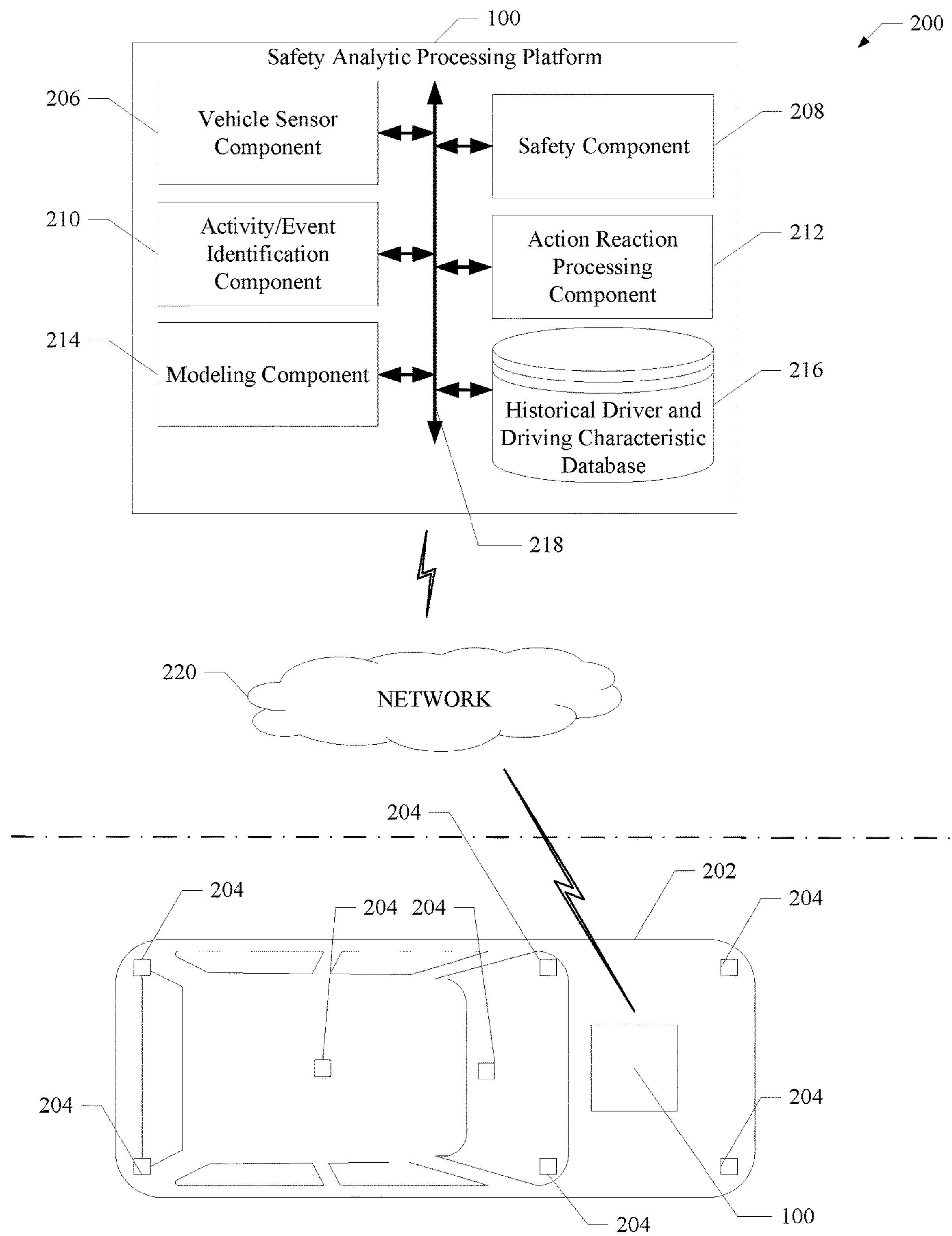
FIG. 2 illustrates an environment including a vehicle comprising the example safety analytic processing platform of FIG. 1.

An environment 200 is shown and described with reference to FIG. 2. The environment 200 may include a vehicle 202, which may comprise one or more sensors 204 for gathering vehicle, driver, and/or environmental data corresponding with the one or more datasets described with respect to FIG. 1 (e.g., dataset 1 102, dataset 2 104, dataset 3 106, dataset 4 108, dataset 5 110, dataset 6 112, dataset 7 114, dataset 8 116, dataset 9 118, dataset 10 120, and/or dataset 11 122). The one or more sensors 204 may comprise one or more odometers, global positioning and/or navigation systems, cameras, level sensors (to detect rollovers), force/pressure/impact sensors, LIDAR, motion sensors, range/proximity sensors, various wireless network interfaces capable of detecting access to different data networks, mobile networks, and other mobile devices (e.g., via Bluetooth), clocks, and/or movement sensors such as, for example, accelerometers, speedometers, compasses, and gyroscopes.

The one or more sensors 204 may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. In some examples, the sensors 204 may be configured to collect data associated with a driver's movements or the condition of a driver, for example, sensors that monitor a driver's movements, such as the driver's eye position and/or head position, etc. In some examples, the sensors 204 may be configured to collect data associated with a vehicle or other vehicles. Additional safety or guidance-assistance features may be included in some vehicles, detecting and storing data such as lane departures, activation of adaptive cruise control, blind spot alerts, etc. The sensors may be installed during vehicle manufacture or as an after-market addition.

The vehicle 202 may further comprise the SAPP 100, which may be integrated into or connected to computer architecture of the vehicle 202 or may be a standalone device, such as a mobile device, in communication with the one or more sensors 204, or any combination thereof. The SAPP 100 may comprise a vehicle sensor component 206, a safety component 208, an activity/event identification component 210, an action reaction processing component 212, a modeling component 214, and a historical driver and driving characteristic database 216. The vehicle sensor component 206, the safety component 208, the activity/event identification component 210, the action reaction processing component 212, the modeling component 214, and the historical driver and driving characteristic database 216 may be in communication via a communication channel such as, for example, bus 218. The SAPP 100 may additional communicate with one or more devices via a network 220.

The example vehicle sensor component 206 may collect data from the one of more sensors 204 associated with the vehicle 202 and/or the historical driver and driving characteristic database 216. In some examples, the vehicle sensor component 206 may process and/or organize the information from the one or more sensors 204 or the historical driver and driving characteristic database 216 into the plurality of datasets described in reference to FIG. 1. In examples wherein the SAPP 100 is implemented via a mobile device, the vehicle sensor component 206 may receive the data from the one or more sensors 204 or the historical driver and driving characteristic database 216 via wireless (e.g., Bluetooth, near field communication, etc.) or wired connection (e.g., universal serial bus (USB)) to the computing architecture of the vehicle 202 or via a network connection. In some examples, the example vehicle sensor component 206 may collect data from additional sensors (e.g., camera or accelerometer of a mobile device).

The example safety component 208 may utilize the data collected by the one or more sensors 204 and processed/organized by the vehicle sensor component 206 to make a number of determinations with respect to the safety of the vehicle 202. The example safety component 208 may utilize raw sensor data to make conclusions regarding driver behaviors or conditions. For example, the safety component 208 may process data from sensors monitoring a driver's eyes to determine whether the driver is alert, focused on the road, distracted, medicated, intoxicated, fatigued, sleeping, etc. Additionally, the safety component 208 may determine an indication of distraction (e.g., sleepiness) based on, for example, lane stability, speed variations, jerks, etc. The example safety component 208 may monitor various driver behaviors and conditions throughout an entirety of a vehicle trip including various vehicle activities, events, actions, and reactions.

The example safety component 208 may utilize such behavior or condition determinations, the one or more datasets of FIG. 1, a driving error model (e.g., generated by the modeling component 214), current vehicle sensor information, current driver conditions, and vehicle event identifications to determine a safety factor for the driver/vehicle. The example safety factor may be a value between 0 and 100 and may provide an indication, at any point in time, how close a driver is in accordance with best driving practices.

The example safety factor may be associated with current driver/driving conditions identified by the one or more sensors 204 to provide contextual information with the safety factor. The example safety component 208 may determine a plurality of safety factors throughout an entire trip of a vehicle. The example safety component 208 may compare the safety factors and the contextual information at various points of the vehicle trip to determine recurring safety concerns, areas for driver improvement, and/or successful driving maneuvers. The safety component 208 may utilize the safety factor(s) in association with insurance services to make or propose insurance premium variations.

The safety component 208 may further determine, based on the safety factor, a vehicle instruction. For example, the safety component 208 may determine that, based on the safety factor, autonomous control of the vehicle 202 would be an improvement to the current control of the vehicle 202. Accordingly, the safety component 208 may output a vehicle instruction to hand-off or otherwise switch the vehicle to autonomous control. Additionally or alternative, the safety component 208 may determine a specific autonomous vehicle maneuver to avoid a vehicle event such as a collision. The safety component 208 may output a specific instruction including the autonomous vehicle maneuver, rather than hand-off or otherwise switch to total autonomous control. Other vehicle instructions may comprise, for example, warnings or alerts regarding traffic condition, wandering eyes, taking hands off wheel, failing to initiate a reaction within a threshold amount of time, increasing volume of audio too high, etc. Such warnings or alerts may be visual (e.g., lights and/or displays), audible (e.g., sounds and/or words), tangible (e.g., haptic feedback), or any combination thereof. The safety component 208 may further provide all determined safety factors, driver/driving behavior determinations, instructions, etc. to the modeling component 214 to generate and/or improve the driving error model.

The example activity/event identification component 210 may identify vehicle activity and vehicle events, such as for example, stopping at a stop light, merging lanes, entering/exiting a highway, turning, etc. The activity/event identification component 210 may utilize data from the one or more sensors 204 and/or the data processed/organized by the vehicle sensor component 206 to identify a vehicle event. For example, navigation data may indicate a vehicle is supposed to take an exit on the right of a highway within one mile. Sensor data associated with the vehicle may indicate said vehicle is in the left most lane. Accordingly, the activity/event identification component 210 may identify the activity of exiting the highway and/or one or more vehicle events to accomplish the activity of exiting the highway (e.g., initiating a turn signal, changing lanes to from left most lane to right most lane, decelerating below the speed limit of the highway, maintaining an exit ramp speed limit, turning, coming to stop, and/or turning onto a different road). In some examples, an activity or event may be identified as it is occurring. For example, the activity/event identification component 210 may identify that a turn signal has been activated on a highway and thus a lane change is likely to occur. Additionally or alternatively, the activity/event identification component 210 may identify a vehicle has begun merging into an adjacent lane and identify that a lane change is occurring. Data regarding the driver (e.g., data indicating driver is checking mirrors/blind spots before or after a turn signal is initiated) may further be used by the activity/event identification component 210 to identify and/or predict a vehicle is about to occur.

In the example wherein the vehicle event is a vehicle collision or a near miss, the activity/event identification component 210 may utilize data from accelerometers configured to detect a deceleration exceeding a threshold to determine whether an impact has occurred. In examples wherein the event is a vehicle collision, the accelerometers may detect a first deceleration above a first threshold. In examples wherein the event is a near miss, the accelerometers may detect a second deceleration above a second threshold, wherein the first threshold is higher than the second threshold. In such examples, the accelerometers may detect an acceleration subsequent to the second deceleration and within a threshold amount of time, which may be indicative of the vehicle slowing to avoid a collision and accelerating away. All vehicle operations may be associated with data signatures like those described above (e.g., deceleration followed by acceleration may be associated with coming to a stop without incident, rapid deceleration followed by nothing may be associated with a vehicle collision, etc.).

Additionally, or alternatively, other sensors may be used to similarly detect an event. For example, range sensors may be used to determine when an object occupies the same space as the vehicle 202 (e.g., the object is 0 inches away). Furthermore, one or more cameras may be utilized in combination with image recognition to identify a vehicle event. Furthermore, the activity/event identification component 210 may communicate with the modeling component 214 using one or more machine learning algorithms (e.g., decision trees, neural networks, etc.) to "learn" what vehicle events (e.g., a vehicle collision) and the moments before the events look like (in terms of sensor data), so that the activity/event identification component 210 may further advance vehicle event detection.

The example action reaction processing component 212 may utilize the data collected by the one or more sensors 204 and processed/organized by the vehicle sensor component 206 to make a number of determinations associated with actions taken by the driver that may impact the safety factor (e.g., eye wandering, hands off wheel, etc.). In some examples, not all actions by the driver may be identifiable (e.g., lack of a sensor, non-consent to use of sensor, etc.). In such examples, the action reaction processing component 212 may utilize other data collected by the one or more sensors 204 and processed/organized by the vehicle sensor component 206 to identify any reactions taken that may implicitly provide context with respect to driver actions. For example, the action reaction processing component 212 may determine the vehicle's reaction to a vehicle event and the time it took the vehicle to react after identification of the vehicle event. The example action reaction processing component 212 may compare determined reactions of the vehicle and the vehicle reaction times to expected reactions and expected reaction times determined by the modeling component 214. For example, the action reaction processing component 212 may compare a vehicle's actual performance (or lack thereof) to the expected performance of the vehicle determined by the modeling component 214 to determine how close the vehicle's action was to the expected performance. The action reaction processing component 212 may compare the time it took the vehicle to react after identification of the vehicle event to the estimated time to perform the expected performance determined by the modeling component 214.

Such comparisons may enable the action reaction processing component 212 to determine actions of the driver. For example, delayed reaction times may correspond with a distracted, medicated, or intoxicated driver. Further determinations may be made by leveraging driver characteristics in the historical driver and driving characteristic database 216. In some examples, the action reaction processing component 212 may determine that a vehicle's reaction is not going to happen (e.g., based on no reaction occurring within a threshold amount of time). The action reaction processing component 212 may balance a time to impact with a time allotted for a vehicle (and its driver) to respond in order to determine the threshold amount of time that the action reaction processing component 212 will wait for a reaction before alerting a driver or switching to autonomous control.

In some examples, the example action reaction processing component 212 generates a maneuver instruction to send to autonomous control systems of a vehicle if the driver does not react within a threshold amount of time. This may be a simple instruction to assume autonomous control of the vehicle or may be a specific autonomous instruction to avoid improper vehicle activity. For example, if an exit ramp is approaching in 0.25 miles and a vehicle has not changed into the most right lane within the last mile, an instruction may be sent to initiate a lane change. In some examples, the action reaction processing component 212 utilizes machine learning algorithms (e.g., neural networks, decision trees, etc.) to use maneuver instructions with unfamiliar events. In some examples, the action reaction processing component 212 communicates its analysis to the safety component 208. In some examples, the action reaction processing component 212 communicates its analysis to the modeling component 214 to generate and/or improve a driver error model.

In some examples, the action reaction processing component 212 may utilize the data collected by the one or more sensors 204 and processed/organized by the vehicle sensor component 206 to determine a current vehicle activity (e.g., vehicle merging, stopping, entering highway, exiting highway, etc.), which may provide additional context to a vehicles action or reaction.

Modeling component 214 may utilize machine learning to generate a driver error model, which may include driver and/or driving behavior models. As used herein, machine learning may include generating one or more models using data from the example historical driver and driving characteristic database 216 and one or more algorithms. In some examples, supervised machine learning is utilized, wherein the one or more generated models are presented with inputs and outputs, and the machine learning algorithm determines one or more general rules to map the inputs to outputs. For example, a subset of the data from the historical driver and driving characteristic database 216, such as, for example, data associated with data immediately prior to past events, may be used as input data and data during and/or immediately after past events may be identified as the output. From these inputs and output (i.e., a training data set), the machine learning algorithms may be able to identify proper and improper vehicle activities. In some examples, the machine learning algorithms may be able to predict occurrences of future vehicle events. Of course, other data may be applied as inputs/outputs such as data from some or all of a trip, speed of vehicles, environmental conditions, time of the day, location of vehicles, vehicle control status information, driver behavior information, vehicle on-board telematics data, contextual information, or any combination thereof.

Machine learning may be applied, as disclosed herein, to identify specific conditions that lead to events from a vehicle's perspective. Predictive behaviors may be used to identify and conform activity prior to any improper variations from expected behaviors. For example, the example machine learning algorithms may be "trained" with camera feeds and/or image recognition data corresponding to various vehicle events such that the activity/event identification component 210 may predict, with high accuracy, that an event is about to occur and/or is occurring. For example, the SAPP 100 may send an instruction to an autonomously controlled vehicle based on identification of an event and/or an identification of a lack of vehicle reaction to the event within a threshold amount of time.

In some examples, the modeling component 214 determines, based on a vehicle event, an expected performance of the vehicle and an estimated time for the vehicle to perform the expected performance. For example, based on data from the historical driver and driving characteristic database 216, global positioning data, navigation data, and/or sensor data, the modeling component 214 may determine that a vehicle is currently or about to be involved in a vehicle event. Vehicle events may comprise any number of vehicle situations including, without limitation, a collision, maintaining a speed in accordance with a speed limit, staying in a lane, a lane change, a turn, an acceleration, a deceleration, etc. with the modeling component 214 may identify, for each vehicle event, expected performances and respective times for performing expected performances. For example, (e.g., come to a safe stop where there is an abundant amount of time to perform an action, decelerate where there is a decreased amount of time to perform an action, swerve where there is a minimal amount of time to perform an action, etc.). The modeling component 214 may identify one of the one or more options as the expected performance of the vehicle based on, for example, the amount of time to react, the safest option, traffic/environment data, etc. The modeling component 214 may communicate, to the action reaction processing component 212, the expected performance of the vehicle and the estimated time for the vehicle to perform the expected performance.

In some examples, the estimated time corresponds to a time between the time that an autonomously controlled vehicle would respond to the vehicle event and the time that an average human operator would respond to the vehicle event. The modeling component 214 may determine a driving error model based on the data from the one or more sensors 204, data from the historical driver and driving characteristic database 216 (e.g., previous driver conditions, previous vehicle events, previous reactions to the previous vehicle events), comparing the vehicle reaction to the expected performance, and comparing the time to the estimated time to perform the expected performance.

The example modeling component 214 may, based on the generated driver error model, identify factors important for risk analysis, utilize event type perspective to determine action behavior, identify event type clusters in the context of risk or safety, identify critical factors for all events or groups of event types, determine thresholds for safety factors and reaction times, determine weight of past driving history for safety factor determinations, associate the safety factor with demographics, and/or predict a driver's current cognitive load.

The example historical driver and driving characteristic database 216 may be a computer readable storage medium or memory that stores one or more of vehicle profiles, vehicle identification information, driver profiles, driver identification information, insurance information associated with a vehicle, information about additional parties related to the driver such as, for example, family members that may or may not be covered by the insurance policy associated with the vehicle, information associated with a plurality of previous events and/or event simulations, previous event reports detailing dates, times, speeds of vehicles involved in the event, vehicle identification numbers, license plate information, routes, locations of the events (e.g., latitude and longitude, address, street, intersection, etc.), sensor and imagery data, whether safety features were equipped/activated in a vehicle, national highway traffic safety administration (NHTSA) level of autonomy of the vehicle, whether the vehicle or driver was in control of the vehicle, communications from the vehicle to the driver, driving conditions, weather conditions, insurance coverage information, vehicle reports, infrastructure devices data, insurance claim information (e.g., whether a claim was submitted, whether the claim was settled, the time taken to settle the claim, etc.), type of damage, severity of damage, parties informed (e.g., emergency medical technicians (EMTs), insurance entities, infrastructure repair services, etc.), condition of the vehicle, insured/vehicle owners, number of passengers, whether seat belts were utilized, passenger weight, vehicle braking, estimate cost to replace/repair damage, etc. Such data may be used by one or more machine learning algorithms for identification of new events, determining causes of the events, associated fault to entities involved in the event, determining autonomous vehicle instructions, etc.

The driver profiles in the historical driver and driving characteristic database 216 may comprises data from the datasets set forth and described with respect to FIG. 1, which correspond to a unique individual. Driver profile information may additionally be physically entered into the database 216 via the individual, determined through online analysis of various social media databases associated with the individual, medical and/or criminal records, and/or analyzed by the methods, systems, or apparatuses described herein and incorporated into the historical driver and driving characteristic database 216. The driver profiles may comprise one or more aspects corresponding to a driver such as, for example, a driver's historical medication use, age, gender, marital status, education, occupation and/or driving data such as, for example, driving experience, crash history, driving behavior, traffic violations, experience with the route, duration of a trip, planned route.

All information gathered and processed in accordance with the methods, systems, or apparatuses described herein may be stored in the historical driver and driving characteristic database 216. In some examples, server based network storage may be utilized in connection with or in lieu of an on board storage device in implementing the historical driver and driving characteristic database 216. In some examples, one or more vehicles involved in and/or in the vicinity of an event collect and/or store data corresponding to date, time, speed of vehicles involved in the event, vehicle identification number, license plate information, route/location of the event (e.g., latitude and longitude, address, street, intersection, etc. based on a global positioning system in the vehicle and/or a user device), sensor and imagery data, whether safety features are equipped/activated in a vehicle, NHTSA level of autonomy of the vehicle, whether the vehicle or driver was in control of the vehicle, known driving conditions, known weather conditions, type of damage, severity of damage, condition of the vehicle, registered vehicle owners/drivers, number of passengers, whether seat belts were utilized, passenger weight, vehicle braking, estimate cost to replace/repair damage, etc. At least some data may be collected via one or more sensors or cameras from one or more vehicles. For example, multiple vehicles equipped in accordance with the present disclosure and in the vicinity of each other may operate, communicate, and acquire data together. Additionally, or alternatively, at least some data may be programmed into and/or stored on the respective vehicles. Such information may be continuously added to the historical driver and driving characteristic database 216.

Figure 3:
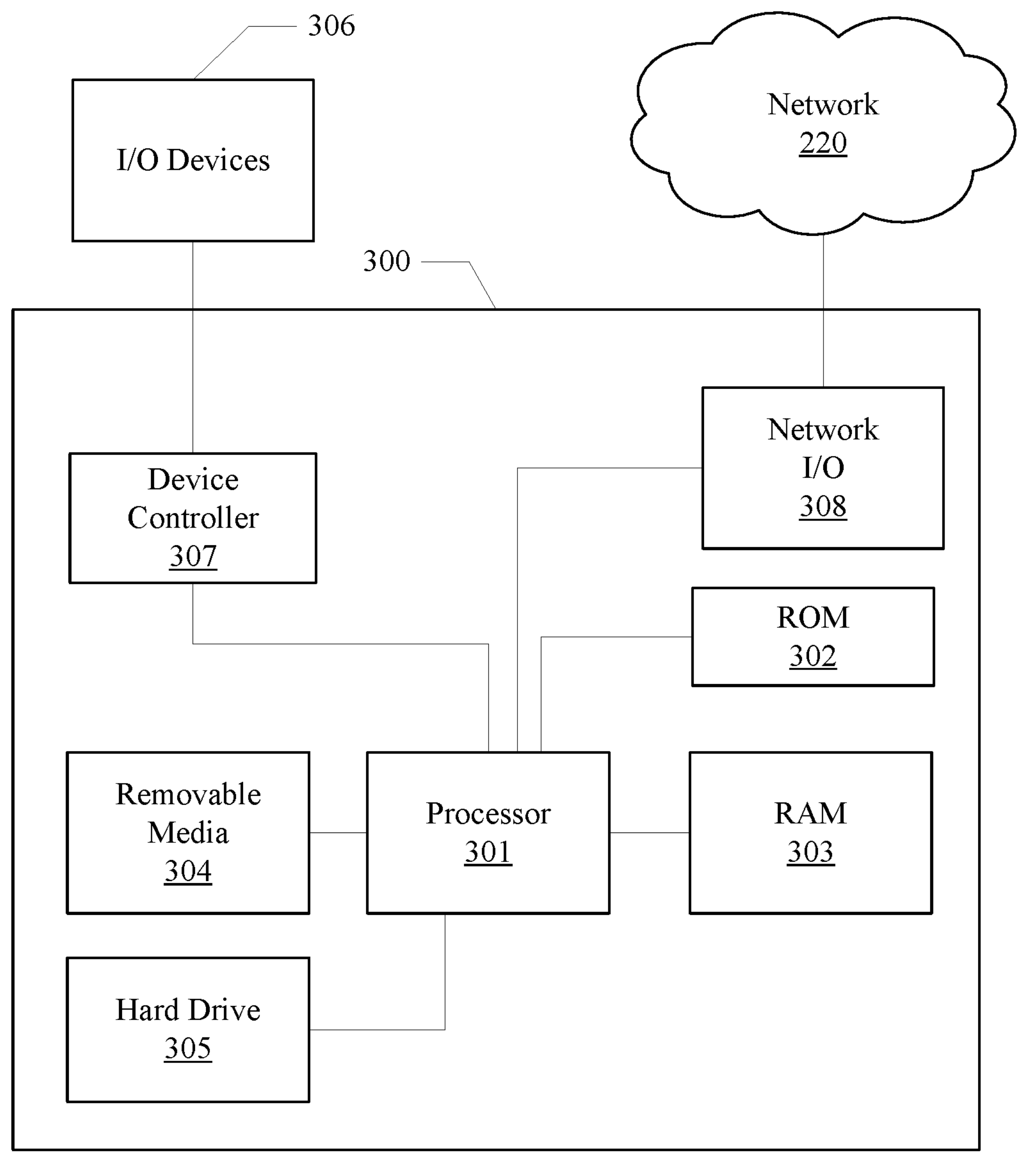
FIG. 3 illustrates an example computing device specifically configured to at least perform the method of FIGS. 4A-4B in accordance with one or more aspects described herein.

The vehicle sensor component 206, the safety component 208, the activity/event identification component 210, the action reaction processing component 212, the modeling component 214, the historical driver and driving characteristic database 216, and/or more generally, the SAPP 100, and/or other computing devices described herein may each be implemented via a hardware platform such as, for example, the computing device 300 illustrated in FIG. 3. In some examples, the computing device 300 may implement the vehicle sensor component 206, the safety component 208, the activity/event identification component 210, the action reaction processing component 212, the modeling component 214, and/or the historical driver and driving characteristic database 216, such that all elements are incorporated into a single device. Some elements described with reference to the computing device 300 may be alternately implemented in software. The computing device 300 may include one or more processors 301, which may execute instructions of a computer program to perform any of the features described herein. The instructions may be stored in any type of tangible computer-readable medium or memory, to configure the operation of the processor 301. As used herein, the term tangible computer-readable storage medium is expressly defined to include storage devices or storage discs and to exclude transmission media and propagating signals. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The computing device 300 may include one or more input/output devices 306, such as a display, touch screen, keyboard, mouse, microphone, software user interface, etc. The computing device 300 may include one or more device controllers 307 such as a video processor, keyboard controller, etc. The computing device 300 may also include one or more network interfaces 308, such as input/output circuits (such as a network card) to communicate with a network such as the example network 220. The network interface 308 may be a wired interface, wireless interface, or a combination thereof. One or more of the elements described above may be removed, rearranged, or supplemented without departing from the scope of the present disclosure.

Figure 4A:
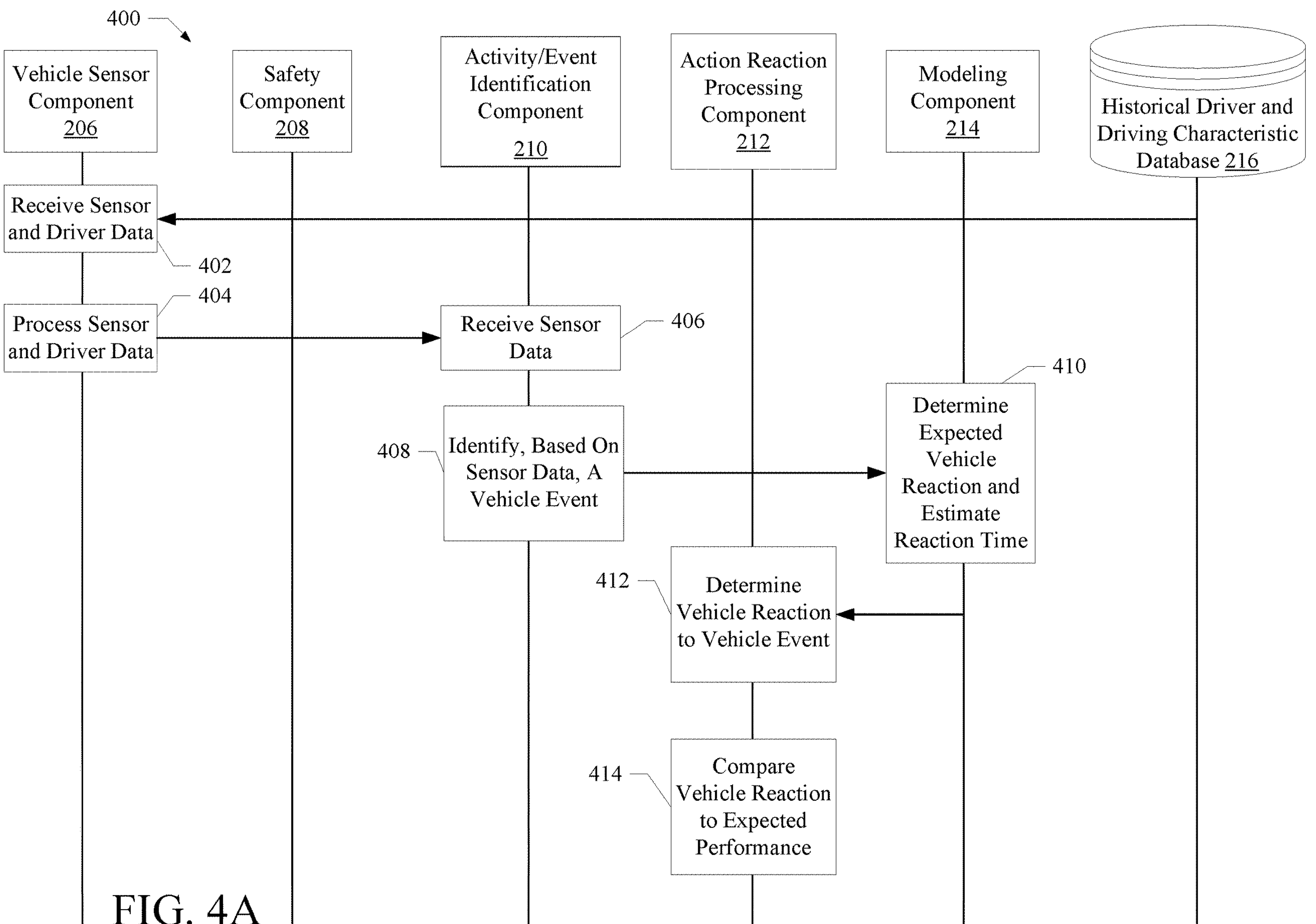
FIGS. 4A-4B are a flow chart illustrative of a process for implementing an example safety analytic processing platform in accordance with one or more aspects described herein.
Figure 4B:
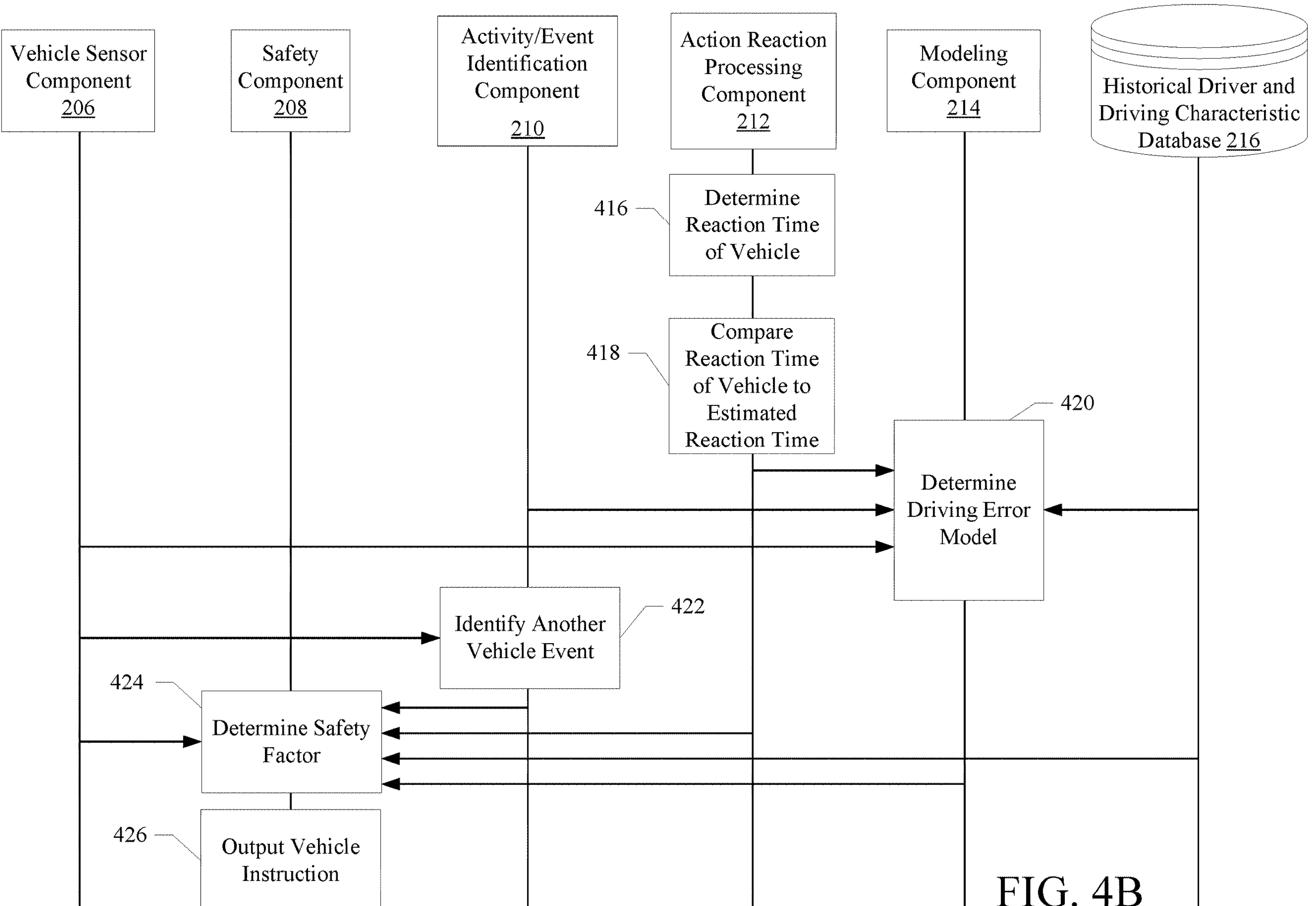

FIGS. 4A-4B are a flow chart illustrative of a process 400 for implementing an example safety analytic processing platform in accordance with one or more aspects described herein. The process 400 may begin with the vehicle sensor component 206, the safety component 208, the activity/event identification component 210, the action reaction processing component 212, the modeling component 214, and/or the historical driver and driving characteristic database 216 being configured. In some examples, the vehicle sensor component 206 receives, from the one or more sensors 204 and/or the historical driver and driving characteristic database 216, sensor data and/or a driver/driving profile (402). The driving profile may comprise a first aspect and a second aspect, wherein the first aspect of the driving profile corresponds to a condition of the driver. The vehicle sensor component 206 may process sensor data received from the sensors 204 and/or the historical driver and driving characteristic database 216 (404). The activity/event identification component 210 may receive sensor data corresponding to vehicle activity and/or one or more vehicle events (406). In some examples, the activity/event identification component 210 receives processed sensor data from the vehicle sensor component 206. In some examples, the activity/event identification component 210 may receive sensor data directly from the one or more sensors 204. The activity/event identification component 210 may identify at least one vehicle event based on the received sensor data (408).

The modeling component 214 may determine, based on identification of the vehicle event, an expected performance of the vehicle and an estimated time to perform the expected performance (410). The action reaction processing component 212 may determine a vehicle reaction to the vehicle event (412). The action reaction processing component 212 may compare, based on the vehicle event, the vehicle reaction to the expected performance to determine a driver's variance from the expected performance (414). The action reaction processing component 212 may determine a reaction time of the vehicle (e.g., a time between identifying the vehicle event and the vehicle reaction occurring) (416). The action reaction processing component 212 may compare the reaction time to the estimated time to perform the expected performance to determine a driver's variance from the estimated time (418). For example, if the vehicle event was decelerating on a highway in preparation to exit the highway, the expected performance may be deceleration from a first speed limit (e.g., the highway speed limit) to a second speed limit (e.g. the exit ramp speed limit) with a threshold amount of time, and action reaction processing component 212 may determine that the vehicle did not decelerate enough, decelerated too much, decelerated too quickly, decelerated too slowly, or decelerated appropriately.

Based on one or more of driver profile aspects, the vehicle event, comparisons of the vehicle reaction to the expected performance, and/or comparisons of the reaction time to the estimated time to perform the expected performance, the modeling component 214 may determine a driving error model (420). In some example, the driving error model comprises driver behavior over an entire trip.

After the driving error model has been generated, the activity/event identification component 210 may identify, based on the plurality of sensors associated with the vehicle, another vehicle event (422). The safety component 208 may determine a safety factor based on the driving error model, current vehicle sensor information, current driver conditions, and the other vehicle event (424). The safety component 208 may output, based on the safety factor, a vehicle instruction (426). Thereafter the example process 400 may cease operation.

While many advantages may be understood from the above, the exhaustive driving analytical systems and modelers disclosed herein may be used for all driving activity in addition to post-accident analysis to understand the accident behavior at an individual or overall level (e.g., arbitration, insurance pricing, proposing laws for certain behaviors, correcting certain road situations, etc.), provide safety metrics, information, and/or alerts for drivers in real-time to prevent occurrences of vehicle events (e.g., accidents and/or close calls), and/or advance autonomous driving technology by determining best times for transitioning from driver to autonomous control or vice-versa).

Below are non-limiting example methods, systems, and apparatuses which may comprise receiving, by a computing device and for a driver, a driving profile comprising a first aspect, wherein the first aspect of the driving profile corresponds to a condition of the driver, identifying, based on a plurality of sensors associated with a vehicle, a first vehicle event, determining, based on the first vehicle event, an expected performance of the vehicle and an estimated time to perform the expected performance, comparing, based on the vehicle event, a vehicle reaction to the expected performance, determining a time between identifying the vehicle event and the vehicle reaction, comparing the time to the estimated time to perform the expected performance, determining, a driving error model based on the first aspect of the driving profile, comparing the vehicle reaction to the expected performance, and comparing the time to the estimated time to perform the expected performance, identifying, based on the plurality of sensors associated with the vehicle, a second vehicle event, determining a safety factor, wherein the determining the safety factor is based on the driving error model, current vehicle sensor information, current driver conditions, and the second vehicle event, and outputting, based on the safety factor, a vehicle instruction.

In some examples, the condition of the driver corresponds to one of a level of distraction, an amount of medication usage, a level of intoxication, an emotional level, a level of experience with current route, or a level of experience with current conditions.

In some examples, the example methods, systems, and apparatuses comprise determining a second aspect of the driving profile, wherein the determining is based on the first aspect of the driving profile, comparing the vehicle reaction to the expected performance, and comparing the time to the estimated time to perform the expected performance.

In some examples, the second aspect of the driving profile was unknown prior to the determining.

In some examples, the vehicle instruction comprises an instruction to hand-off or otherwise switch the vehicle to an autonomous driving mode based on the safety factor failing to satisfy a threshold.

In some examples, the estimated time to perform the expected performance is between a first amount of time in which an autonomous vehicle would perform the expected performance and a second amount of time in which an average non-distracted human operator would perform the expected performance.

In some examples, the example methods, systems, and apparatuses comprise generating a vehicle report, wherein the vehicle report comprises the first aspect and the second aspect of the driving profile, the vehicle reaction the time between identifying the vehicle event and the vehicle reaction and the estimated time to perform the expected performance.

Example methods, systems, and apparatuses may comprise receiving, by a computing device and for a driver, a driving profile comprising a first aspect and a second aspect, wherein the first aspect of the driving profile corresponds to a condition of the driver, identifying, based on a plurality of sensors associated with a vehicle, a vehicle event, determining, based on identifying the vehicle event, an expected performance of the vehicle and an estimated time to perform the expected performance, comparing, based on the vehicle event occurring, an action of the vehicle to the expected performance, determining a time between identifying the vehicle event and the action of the vehicle, comparing the time to the estimated time to perform the expected performance, determining, based on the first aspect of the driving profile, based on comparing the action of the vehicle to the expected performance, and based on comparing the time to the estimated time to perform the expected performance, a value for the second aspect of the driving profile, and generating a vehicle report, wherein the vehicle report comprises the first aspect and the second aspect of the driving profile, the action of the vehicle, the time between identifying the vehicle event and the action of the vehicle, and the estimated time to perform the expected performance.

In some examples, the second aspect corresponds to one of a level of distraction of the driver, a medication usage history, an intoxication history, an occupation status, a marital status, a level of experience with current route, or a level of experience with current conditions.

In some examples, the example methods, systems, and apparatuses comprise determining a third aspect of the driving profile, wherein the determining is based on the first aspect of the driving profile, the second aspect of the driving profile, comparing the action of the vehicle to the expected performance, and comparing the time to the estimated time to perform the expected performance.

In some examples, the third aspect of the driving profile was unknown prior to the determining.

In some examples, the example methods, systems, and apparatuses comprise sending an instruction to hand-off or otherwise switch the vehicle to an autonomous driving mode.

In some examples, the estimated time to perform the expected performance is between a first amount of time in which an autonomous vehicle would perform the expected performance and a second amount of time in which an average non-distracted human operator would perform the expected performance.

In some examples, the example methods, systems, and apparatuses comprise determining a safety factor based on the first aspect and the second aspect of the driving profile, the action of the vehicle, the time between identifying the vehicle event and the action of the vehicle, and the estimated time to perform the expected performance, and including the safety factor in the vehicle report.

Example methods, systems, and apparatuses may comprise accessing, by a computing device, a driving error model, wherein the driving error model is based on previous driver conditions, previous vehicle events, previous reactions to the previous vehicle events, and at least one comparison between a reaction time of one of the previous reactions to the previous vehicle events and an expected reaction time, identifying, based on a plurality of sensors associated with a vehicle, a vehicle event, determining a safety factor, wherein the determining the safety factor is based on the driving error model, current vehicle sensor information, current driver conditions, a vehicle reaction to the vehicle event, and the vehicle event, and outputting, based on the safety factor, a vehicle instruction.

In some examples, the vehicle instruction comprises an instruction to hand-off or otherwise switch the vehicle to an autonomous driving mode based on the safety factor failing to satisfy a threshold.

In some examples, the current driver conditions corresponds to one of a level of distraction, an amount of medication usage, a level of intoxication, an emotional level, a level of experience with current route, or a level of experience with current environment conditions.

In some examples, the estimated reaction time is between a first amount of time in which an autonomous vehicle reacted to one of the previous vehicle events and a second amount of time in which an average non-distracted human operator reacted to the one of the previous vehicle events.

In some examples, the example methods, systems, and apparatuses comprise generating a vehicle report, wherein the vehicle report comprises the safety factor, the vehicle event, and the vehicle reaction to the vehicle event.

In some examples, the computing device comprises a mobile device within a vehicle.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:

1. A method comprising:

receiving, by a computing device having at least one processor and for a driver, a driving profile comprising a first aspect, wherein the first aspect of the driving profile corresponds to a condition of the driver;

identifying, by the at least one processor and based on a plurality of sensors associated with a vehicle, a first vehicle event;

determining, by the at least one processor and based on the first vehicle event, an expected performance of the vehicle and an estimated time to perform the expected performance;

comparing, by the at least one processor and based on the first vehicle event, a vehicle reaction to the expected performance;

determining, by the at least one processor, a time between identifying the vehicle event and the vehicle reaction;

comparing, by the at least one processor, the time with the estimated time to perform the expected performance;

determining, by the at least one processor, a driving error model associated with the driver based on:

the first aspect of the driving profile, comparing the vehicle reaction with the expected performance, and comparing the time with the estimated time to perform the expected performance;

identifying, by the at least one processor and based on the plurality of sensors associated with the vehicle, a second vehicle event;

determining, by the at least one processor, a safety factor associated with the driver, wherein the determining the safety factor is based on:

the driving error model;

current vehicle sensor information;

current driver conditions; and the second vehicle event; and outputting, by the at least one processor and based on the safety factor, a vehicle instruction.

2. The method of claim 1, wherein the condition of the driver corresponds to one of a level of distraction, an amount of medication usage, a level of intoxication, an emotional level, a level of experience with current route, or a level of experience with current conditions.

3. The method of claim 1, further comprising:

determining, by the at least one processor, a second aspect of the driving profile, wherein the determining is based on:

the first aspect of the driving profile, comparing, by the at least one processor, the vehicle reaction to the expected performance, and comparing, by the at least one processor, the time to the estimated time to perform the expected performance.

4. The method of claim 3, further comprising:

generating, by the at least one processor, a vehicle report, wherein the vehicle report comprises:

the first aspect and the second aspect of the driving profile;

the vehicle reaction;

the time between identifying the first vehicle event and the vehicle reaction; and the estimated time to perform the expected performance.

5. The method of claim 1, further comprising determining, based on the first vehicle event and based on the second vehicle event, vehicle activity.

6. The method of claim 1, wherein the vehicle instruction comprises an instruction to switch the vehicle into an autonomous driving mode based on the safety factor failing to satisfy a threshold.

7. The method of claim 1, wherein the estimated time to perform the expected performance is between a first amount of time in which an autonomous vehicle would perform the expected performance and a second amount of time in which an average non-distracted human operator would perform the expected performance.

8. A method comprising:

receiving, by a computing device having at least one processor and for a driver, a driving profile comprising a first aspect and a second aspect, wherein the first aspect of the driving profile corresponds to a condition of the driver;

identifying, by the at least one processor and based on a plurality of sensors associated with a vehicle, a vehicle event;

determining, by the at least one processor and based on identifying the vehicle event, an expected performance of the vehicle and an estimated time to perform the expected performance;

comparing, by the at least one processor, a maneuver of the vehicle based on the vehicle event with the expected performance;

determining, by the at least one processor, a time between identifying the vehicle event and the maneuver of the vehicle;

comparing, by the at least one processor, the time with the estimated time to perform the expected performance;

determining, by the at least one processor and based on the first aspect of the driving profile, based on comparing the maneuver of the vehicle to the expected performance, and based on comparing the time to the estimated time to perform the expected performance, a value for the second aspect of the driving profile; and generating, by the at least one processor, a vehicle report, wherein the vehicle report comprises:

the first aspect and the second aspect of the driving profile;

the maneuver of the vehicle;

the time between identifying the vehicle event and the maneuver of the vehicle; and the estimated time to perform the expected performance.

9. The method of claim 8, wherein the second aspect corresponds to one of a level of distraction of the driver, a medication usage history, an intoxication history, an occupation status, a marital status, a level of experience with current route, or a level of experience with current conditions.

10. The method of claim 8, further comprising:

determining, by the at least one processor, a third aspect of the driving profile, wherein the determining is based on:

the first aspect of the driving profile, the second aspect of the driving profile, comparing the maneuver of the vehicle to the expected performance, and comparing the time to the estimated time to perform the expected performance.

11. The method of claim 8, further comprising:

identifying a second vehicle event; and determining, based on the vehicle event and based on the second vehicle event, vehicle activity.

12. The method of claim 8, further comprising:

sending, by the at least one processor, an instruction to switch the vehicle into an autonomous driving mode.

13. The method of claim 8, wherein the estimated time to perform the expected performance is between a first amount of time in which an autonomous vehicle would perform the expected performance and a second amount of time in which an average non-distracted human operator would perform the expected performance.

14. The method of claim 8, further comprising:

determining, by the at least one processor, a safety factor based on:

the first aspect and the second aspect of the driving profile;

the maneuver of the vehicle;

the time between identifying the vehicle event and the maneuver of the vehicle; and the estimated time to perform the expected performance; and including the safety factor in the vehicle report.

15. A method comprising:

accessing, by a computing device having at least one processor, a driving error model associated with a driver, wherein the driving error model is based on:

previous driver conditions;

previous vehicle events;

previous reactions to the previous vehicle events; and at least one comparison between a reaction time of one of the previous reactions to the previous vehicle events and an expected reaction time;

identifying, by the at least one processor and based on a plurality of sensors associated with a vehicle, a vehicle event;

determining, by the at least one processor, a safety factor, wherein the determining the safety factor is based on:

the driving error model;

current vehicle sensor information;

current driver conditions;

a vehicle reaction to the vehicle event; and the vehicle event; and outputting, by the at least one processor and based on the safety factor, a vehicle instruction.

16. The method of claim 15, wherein the vehicle instruction comprises an instruction to switch the vehicle into an autonomous driving mode based on the safety factor failing to satisfy a threshold.

17. The method of claim 15, wherein the current driver conditions corresponds to one of a level of distraction, an amount of medication usage, a level of intoxication, an emotional level, a level of experience with current route, or a level of experience with current environment conditions.

18. The method of claim 15, wherein the expected reaction time is between a first amount of time in which an autonomous vehicle reacted to one of the previous vehicle events and a second amount of time in which an average non-distracted human operator reacted to the one of the previous vehicle events.

19. The method of claim 15, further comprising:

generating, by the at least one processor, a vehicle report, wherein the vehicle report comprises:

the safety factor;

the vehicle event; and the vehicle reaction to the vehicle event.

20. The method of claim 15, wherein the computing device comprises a mobile device within a vehicle.

* * * * *